United States Patent [19]

Burquier

[11] 4,397,445
[45] Aug. 9, 1983

[54] SAFETY VALVE UNIONS

[75] Inventor: Jean-Luc Burquier, Veyrier du Lac, France

[73] Assignee: S.A. Des Etablissements Staubli, Faverges, France

[21] Appl. No.: 260,454

[22] Filed: May 4, 1981

[30] Foreign Application Priority Data

May 13, 1980 [FR] France ................... 80 11161

[51] Int. Cl.³ .......................................... F16L 37/28
[52] U.S. Cl. ................... 251/149.9; 251/89.5; 251/99; 251/152
[58] Field of Search ............... 251/149.2, 149.9, 89.5, 251/148, 152, 99; 137/614.06

[56] References Cited

U.S. PATENT DOCUMENTS

| | | | |
|---|---|---|---|
| 1,697,278 | 1/1929 | Kendrick | 251/99 |
| 2,493,271 | 1/1950 | Smith et al. | 251/149 |
| 3,423,063 | 1/1969 | German | 251/149.6 |
| 4,057,883 | 11/1977 | Paptzun | 29/157.1 R |

FOREIGN PATENT DOCUMENTS

| | | |
|---|---|---|
| 2082006 | 10/1971 | France . |
| 638959 | 6/1950 | United Kingdom . |
| 844258 | 8/1960 | United Kingdom . |
| 1264890 | 2/1972 | United Kingdom . |
| 1503647 | 3/1978 | United Kingdom . |
| 2004031 | 3/1979 | United Kingdom . |

Primary Examiner—A. Michael Chambers
Attorney, Agent, or Firm—Dowell & Dowell

[57] ABSTRACT

The present invention relates to safety valve unions wherein the rotating plug is shaped so as to retain when it is in open position the terminal end of the male element which is released when said plug has been brought into closed position. The opposite faces of the boss and of the pivoting lever are shaped to provide an intermediate position in which the plug is closed, the downstream pipe of the male element is decompressed through a channel and a vent in register, and the terminal is still locked in the bore. The invention is more particularly applicable to the hydraulic or pneumatic accessory industry.

2 Claims, 6 Drawing Figures

SAFETY VALVE UNIONS

The present invention relates to improvements in safety valve unions.

It is known that, in the pneumatic or hydraulic accessory industry, the term "valve unions" generally designates devices comprising two mating elements connected to separate pipes and adapted to fit and lock in each other, thus joining the interiors of said pipes. The body of the female element, which is connected to the upstream pipe in the direction of flow of the fluid through the two pipes to be connected, contains an adjustable valving member provided with an actuation means adapted to be maneuvered by the user. These valve unions are generally provided with a safety system which prevents disconnection of the two elements when the valve is in open position and, when the adjustable valving member is closed, ensures decompression of the interior of the downstream pipe associated with the male element.

In certain of the constructions which have been proposed, the valving member, constituted by a rotatable spherical plug, is controlled by a ring mounted to slide axially on the body of the corresponding element of the device, whilst the mechanism for locking the two interfitting elements comprises a series of balls actuated radially by a mobile sleeve to engage in an annular depression in the male element; this sleeve is itself immobilised axially by a second series of balls controlled by the sliding maneuvering ring. The safety function is thus performed, but at the cost of a delicate and expensive construction.

It is a particular object of the present invention to remedy this drawback and to provide a valve union with a spherical plug which is of simple and economical construction, whilst guaranteeing safety which is at least as complete as that of the known devices.

The invention consists mainly in arranging one of the openings of the through bore of the rotating plug so that the terminal end of the male element may be engaged and locked therein when said plug is in position of closure and axially retained therein when this plug has been displaced angularly to be brought to open position. The body and the means for actuating the plug, formed by a maneuvering lever, comprise two combined series of stepped stops arranged automatically to ensure that the plug stops at least momentarily in an intermediate position, upon closure of the valve, such that said plug closes the upstream pipe and allows decompression of the downstream pipe.

The invention will be more readily understood on reading the following description with reference to the accompanying drawings, in which.

Figure 1:
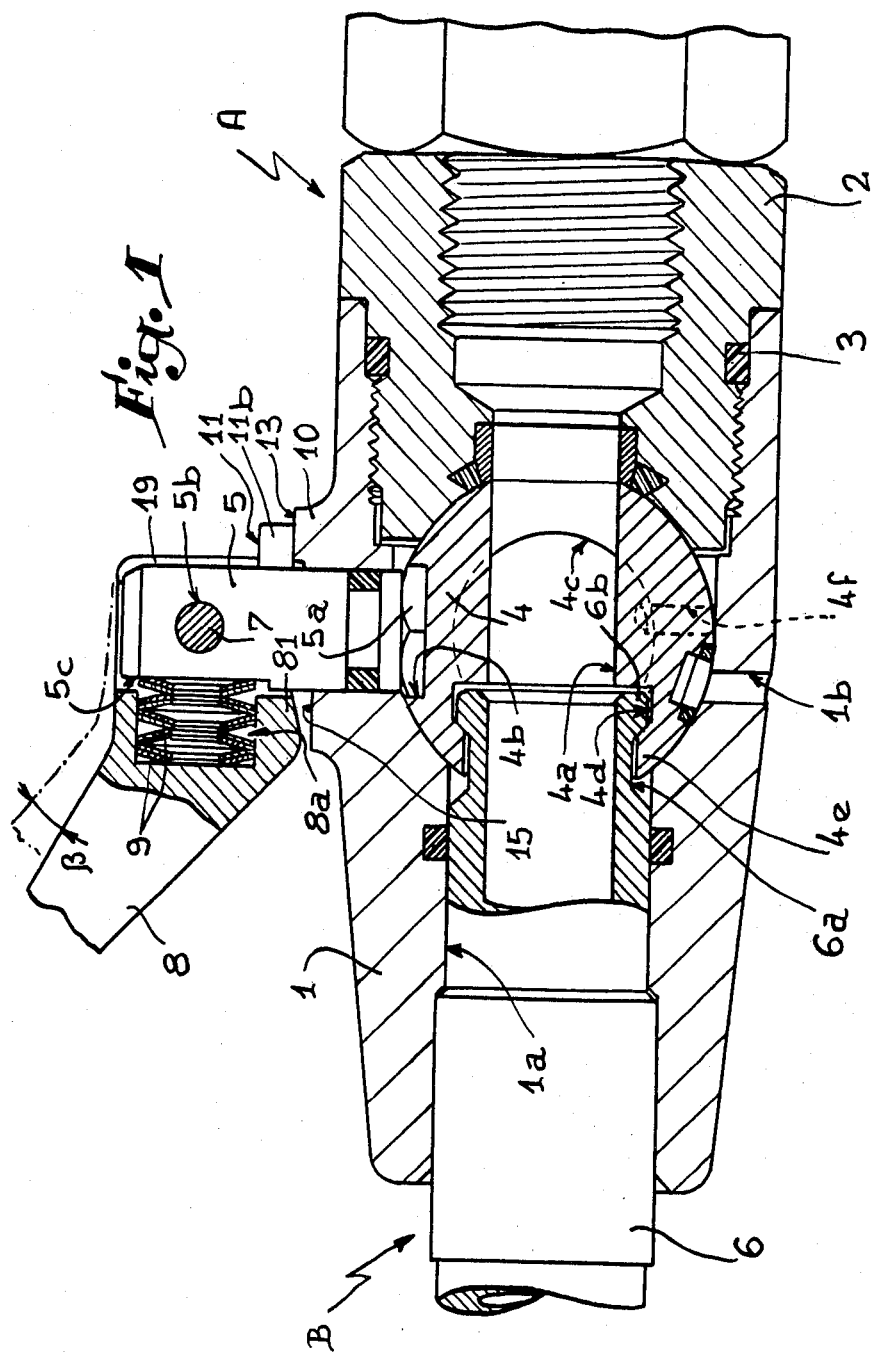
FIG. 1 is an axial section through a valve union according to the invention, shown in open position.
Figure 2:
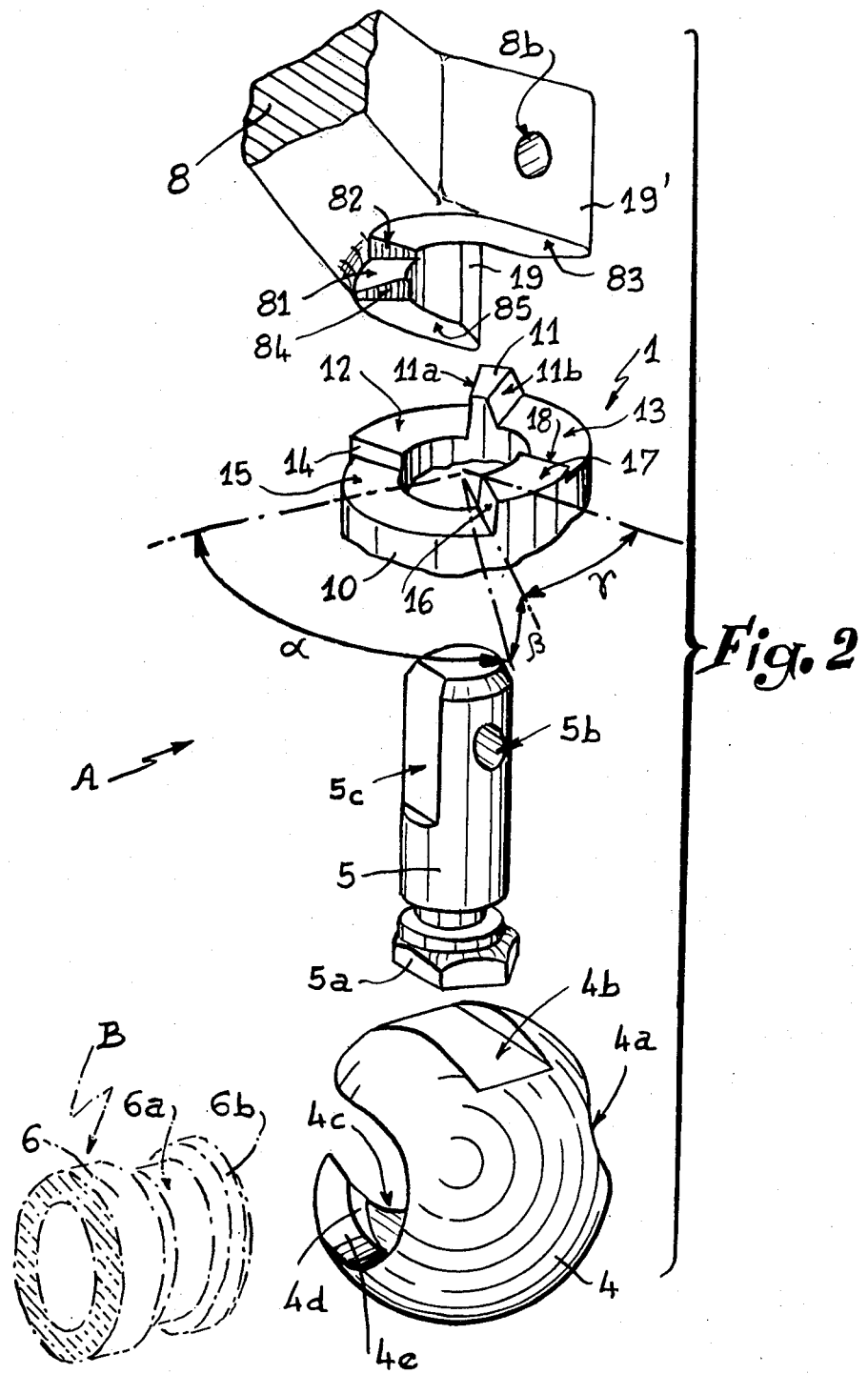
FIG. 2 is a view in perspective showing, in superposition, the spherical plug, its control shaft, the upper face of the body through which this shaft passes and the end of the pivoting maneuvering lever.

Referring now to the drawings, the body of the female element A of the valve union shown in FIG. 1 is formed by assembly of two tubular pieces 1 and 2 screwed into each other with the interposition of an O-ring 3, the rear piece 2 being adapted to be fixed on the end of one of the two pipes to be connected. In this body 1-2 is rotatably mounted a spherical plug 4 pierced with a through bore 4a and it will be observed that one of the openings thereof is adapted to receive and retain the terminal of the male element B, as will be described in detail hereinbelow. As shown in FIG. 2, the upward-facing part of this plug 4 is provided with a depression 4b in which is engaged the hexagonal base 5a of a vertical manoeuvring shaft 5, which is guided in the piece 1 in order to be able to move angularly, closely coupled with said plug.

Figure 3:
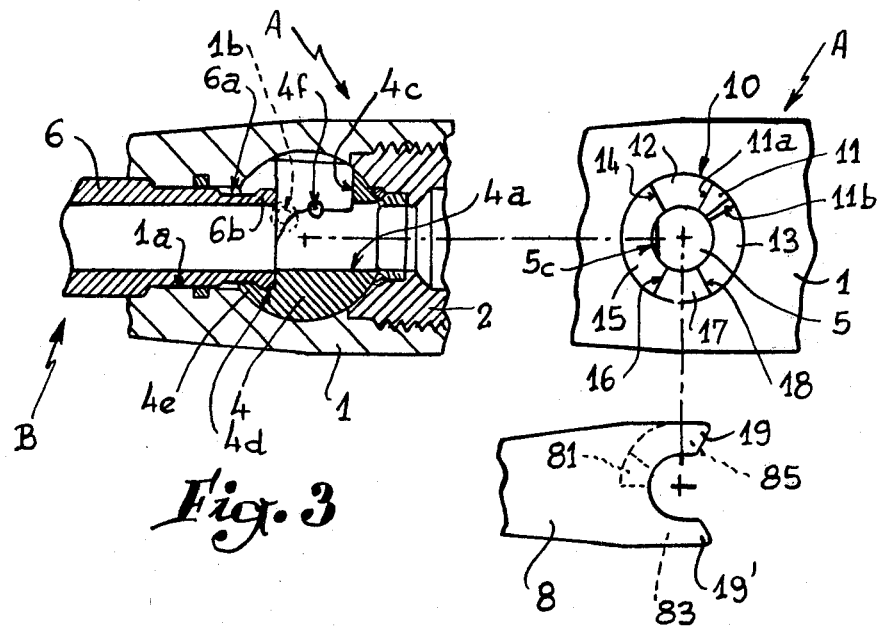
FIGS. 3, 4 and 5 show, side by side, for each of the three significant angular positions of the plug, a horizontal axial section of the central part of the union and a plan view of the boss provided on the upper face of the body, the pivoting maneuvering lever being shown detached.
Figure 4:
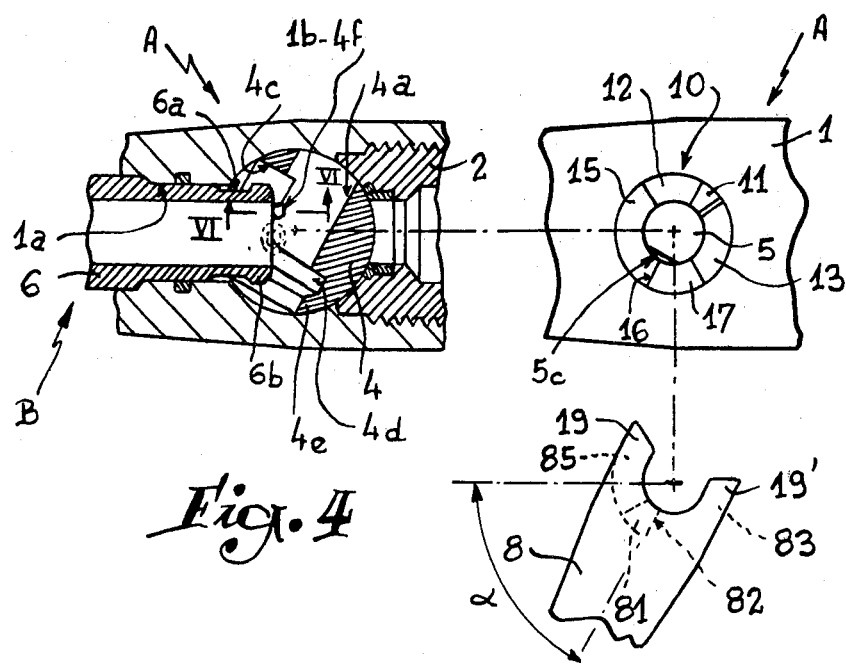
Figure 5:
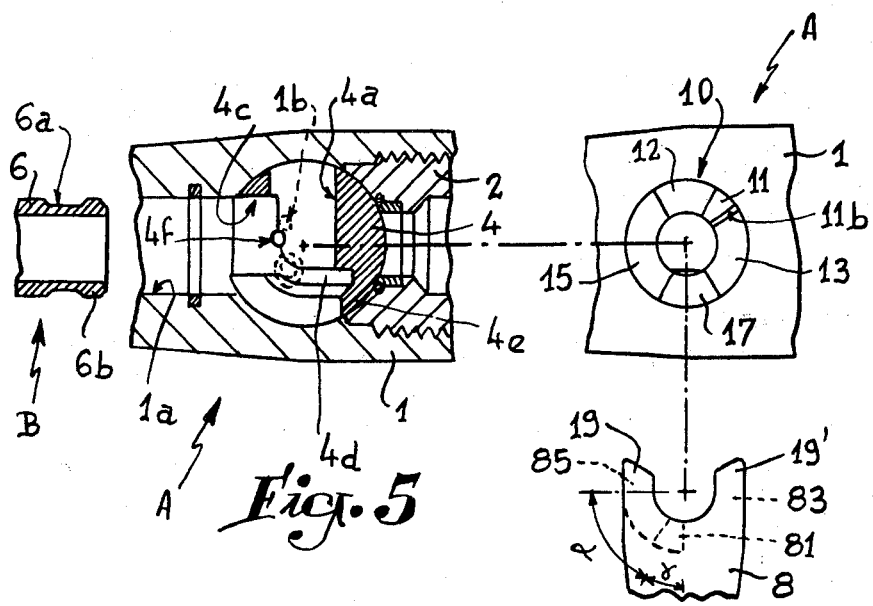

As is shown more particularly in the sectional views of FIGS. 3, 4 and 5, the through bore 4a of the plug 4 communicates with a lateral chamber 4c which has a cylindrical cross section oriented perpendicularly to the axis of said bore, the inner diameter of this chamber 4c being larger than that of the opening of the bore 4a to which it is connected. This connection determines in said opening an inner housing of semi-circular section, referenced 4d in FIGS. 4 and 5 and provided with a semi-annular lip 4e.

As a result of this structure, it will be understood that, when the plug 4 is oriented in the body 1-2 so that its through bore 4a is in transverse position of closure, FIG. 5, the chamber 4c opens axially in the direction of the bore 1a of the body 1-2, so that the cylindrical end or terminal 6 of the male element B (FIG. 1) connected to the second pipe can be introduced through this bore 1a and into the said chamber 4c. The terminal 6 comprises an annular depression 6a which determines a terminal head 6b, the radius of this depression 6a being substantially equal to the inner radius of the lip 4e which partly surrounds the housing 4d mentioned above. Once the terminal 6 has been engaged in the chamber 4c, it suffices to pivot the plug 4 about its vertical axis so that the housing 4d progressively overlaps the head 6b (FIG. 4), which is finally retained in position by the lip 4e in the body of the female element. It is obvious that, by pivoting the plug 4 in the opposite direction, the head 6b of the male element B is released and may be axially withdrawn.

That part of the shaft 5 which projects above the body 1-2 is pierced transversely at 5b(FIG. 2) to receive a pin 7(FIG. 1) on on which pivots the forked end of a maneuvering lever or spanner 8; the pivoting of this lever 8 consequently rotates the shaft 5 and the plug 4, but said lever is also free to pivot in a vertical plane. Elastic washers 9, engaged between a flat portion 5c of the shaft 5 and the bottom of a blind housing 8a in the lever 8, tend to return the latter into low position, therefore applying its pivoting terminal fork against the upper face of the piece 1.

This upper face is provided, around the opening through which the shaft 5 passes, with an annular boss in relief, referenced 10 in FIGS. 2 to 5. As is shown more particularly in FIG. 2, this boss 10 comprises a tooth 11 which is connected by a vertical face 11a to a flat area 12 and by an opposite oblique face 11b, to a flat area 13; the flat area 12 terminates at a step 14 which is followed by a lower flat area 15, a step 16 and a flat area 17, which is disposed at a height greater than the flat area 13 mentioned above to which it is connected by a step 18. Moreover, it should be observed that the lower face of the terminal fork of the lever 8 is provided, to the rear of the perforation 8b through which the pivot pin 7 passes, with a tooth 81 of which the free lower face is bevelled, one of the edges of this tooth being connected by a face 82 to a lateral flat area 83 of higher level, whilst the opposite edge is connected by a step 84 to a lower lateral flat area 85.

To explain the functioning and use of the valve union described hereinabove, the position illustrated in FIGS. 1 and 3 will be taken as the starting position; the plug 4 is in fully open position, the opening of its bore 4a retaining the head 6b of the male element B in place. It will be noted that the lever 8 is then oriented axially with respect to the body 1–2 of the female element A, so that the flat area 85 of said lever abuts against the flat part 12 of the boss 10, the tooth 81 being located above the lower flat part 15.

When the user intends to reduce the rate of flow of the fluid passing through the valve union, he/she maneuvers the lever 8 in anticlockwise direction, so as to give the bore 4a an oblique orientation which reduces its free section. Any attempt to rotate the lever in the opposite clockwise direction results in failure since the free edge of the side arm 19 of the terminal fork of said lever is in abutment against the vertical face 11a of the tooth 11.

If the user wishes to interrupt the rate of flow of fluid passing through the device completely, he/she, rotates the lever angularly in anti-clockwise direction, as indicated hereinabove, by the angular amplitude indicated at α in FIG. 2 (of the order of 60° in the example in question). In any case, the rotation of the lever 8 is stopped by abutment of the step 82 against step 16 (FIG. 4). The obliqueness of the bore 4a of the plug is such that all circulation is interrupted. However, it will be noted that as illustrated in FIG. 6, in this position, a small escape channel 4f in the plug 4 is in register with a vent 1b in the piece 1 of the body 1-2, so that the downstream pipe associated with the male element B is decompressed.

Figure 6:
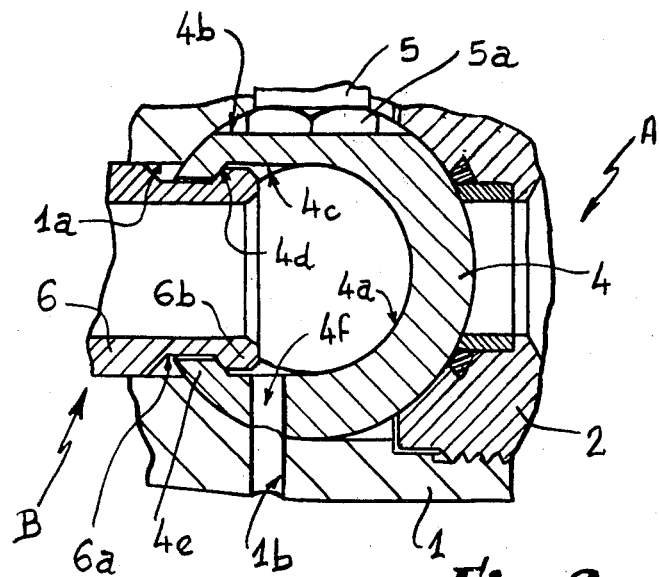
FIG. 6 is a detailed section along the plane indicated at VI—VI in FIG. 4.

In the position illustrated in FIGS. 4 and 6, the head 6b of the terminal 6 remains locked inside the plug 4. To disconnect the two elements A and B, the operator must firstly pivot the lever 8 upwardly (angle β of FIG. 2, or about 10°), so that the step 82 escapes from step 16, and then said lever must be rotated to turn the shaft 5 through angle γ (or about 30°) to an unlocked position until the end of the side arm 19' of the fork abuts against the oblique face 11b of the tooth 11 (FIG. 5). In the course of this angular displacement γ, the tooth 81 slides against the flat area 17 and thus maintains the lever in raised position, the bevel of this tooth 81 being intended to allow the lever 8 to incline by pivoting.

The male element B is then released and may consequently be withdrawn axially from the female element A without any risk of sudden expulsion due internal pressure, which has been released by to the decompression effected through the channel 4f and vent 1b. When it is desired to assemble this element B with element A again, the lever 8 must be returned to the initial orientation after engagement of the head 6b. This lever 8 pivots downwardly under the effect of the washers 9 as soon as it has passed the intermediate position of FIG. 4, the tooth 81 escaping the flat area 17 to be positioned above the flat area 15, as was originally the case (FIGS. 1 and 3).

It will be understood that, despite the complexity of the section of the boss 10 and the lower face of the forked end of the lever 8, the piece 1 and said lever can easily be manufactured by moulding, without requiring any adjustment. The cost price of the device therefore remains moderate, whilst its safety (impossibility of disconnecting the two elements before closure of the valve and decompression of the downstream pipe) is at least as satisfactory as the safety offered by conventional constructions which are much more expensive.

The foregoing description has, of course, been given only by way of non-limiting example and in no way limits the field of the invention; equivalent details of execution may be substituted without departing from the scope of the invention.

What is claimed is:

1. In a safety valve union for connecting a downstream male element with a pressurized upstream female element, the union being of the type wherein the female element has in its body a rotary valve plug controlled by a maneuvering lever to rotate the plug selectively between open, closed, vented and release positions, an improved structure for locking the male and female elements together in certain positions of the valve plug, the structure comprising:
   (a) said body of the female element having an upstream coupling and having a bore extending therefrom through a central bore portion which houses said rotary valve plug and therebeyond to a cylindrical bore which is shaped to receive said male element;
   (b) said male element having a downstream coupling and having a bore extending therefrom through an elongated cylindrical portion shaped to enter said cylindrical bore of the female element, the cylindrical portion of the male element having a locking depression near its terminal end; and
   (c) the valve plug having a bore extending therethrough disposed to align with the bores of said elements in said open position, and the plug having within its bore lip means disposed when the plug is in said open and closed positions to engage in said depression and lock the elements together and located when the plug is in said release position to be disengaged from said depression to permit disconnection of said male element.

2. In a valve union as claimed in claim 1, said terminal end of the male element extending into the bore of the valve plug, and the bore of the plug including a through bore aligned with the bores of the elements in the open position, and the plug having a lateral chamber extending out of the plug perpendicularly from said through bore and of larger diameter, the lateral chamber being larger in diameter than the terminal end of the male element and being aligned therewith in said release position, and said lip means extending around the end of the through bore and being interrupted where it intersects said lateral chamber.

* * * * *